(12) United States Patent
Angelov et al.

(10) Patent No.: US 11,429,845 B1
(45) Date of Patent: Aug. 30, 2022

(54) SPARSITY HANDLING FOR MACHINE LEARNING MODEL FORECASTING

(71) Applicant: Intuit Inc., Mountain View, CA (US)

(72) Inventors: Ivelin Georgiev Angelov, San Diego, CA (US); Yanting Cao, San Diego, CA (US); Seid Mohamadali Sadat, San Diego, CA (US); Avishek Kumar, Escondido, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/707,309

(22) Filed: Mar. 29, 2022

(51) Int. Cl.
  *G06N 3/04* (2006.01)
  *G06N 3/10* (2006.01)
(52) U.S. Cl.
  CPC ............. *G06N 3/0481* (2013.01); *G06N 3/10* (2013.01)
(58) Field of Classification Search
  None
  See application file for complete search history.

(56) References Cited

U.S. PATENT DOCUMENTS

| | | | | |
|---|---|---|---|---|
| 6,314,414 | B1 * | 11/2001 | Keeler | G06N 3/0472 706/22 |
| 2020/0364596 | A1 * | 11/2020 | Zang | G06N 20/00 |
| 2020/0401888 | A1 * | 12/2020 | Gugulothu | G06N 3/0454 |

OTHER PUBLICATIONS

Gugulothu, Narendhar, Easwar Subramanian, and Sanjay P. Bhat. "Sparse Recurrent Mixture Density Networks for Forecasting High Variability Time Series with Confidence Estimates." International Conference on Artificial Neural Networks. Springer, Cham, 2019. (Year: 2019).*

* cited by examiner

Primary Examiner — Benjamin P Geib
(74) Attorney, Agent, or Firm — Paradice and Li LLP

(57) ABSTRACT

Systems and methods for generating regressors based on data sparsity using a machine learning (ML) model are described. A system is configured to provide a plurality of time series datasets to a recurrent neural network (RNN) of a machine learning (ML) model. The RNN generates one or more outputs associated with one or more time series datasets, and the system provides a first portion and a second portion of the one or more outputs to a regressor layer and a classification layer of the ML model, respectively. The regressor layer generates one or more regressors for the one or more time series datasets, and the classification layer generates one or more classifications associated with the one or more regressors (with each indicating whether an associated regressor is valid). Whether a classification indicates a regressor is valid may be based on time series data sparsity.

20 Claims, 4 Drawing Sheets

SPARSITY HANDLING FOR MACHINE LEARNING MODEL FORECASTING

TECHNICAL FIELD

This disclosure relates generally to machine learning model forecasting, such as handling sparse data used in machine learning model forecasting.

DESCRIPTION OF RELATED ART

Machine learning models are used in many applications to predict future events. For example, a machine learning model may be used to predict future weather forecasts based on current and historical weather patterns. In another example, a machine learning model may be used to predict future home prices based on current prices and historical economic data. In a further example, a machine learning model may be used to predict spending or cash flow based on current events and historical data to help identify changes in spending habits and such consequences. Sparse data may impact a machine learning model's prediction accuracy, as more comprehensive data provided to a machine learning model allows the machine learning model to provide more accurate predictions.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for generating regressors using a machine learning model. The example method includes obtaining a plurality of time series datasets for a period of time. The example method also includes providing the plurality of time series datasets to a recurrent neural network (RNN) of a machine learning (ML) model. The example method further includes generating, by the RNN, one or more outputs associated with one or more time series datasets of the plurality of time series datasets. The example method also includes providing a first portion of the one or more outputs to a regressor layer of the ML model. The example method further includes providing a second portion of the one or more outputs to a classification layer of the ML model. The example method also includes generating, by the regressor layer, one or more regressors for the one or more time series datasets. The example method further includes generating, by the classification layer, one or more classifications associated with the one or more regressors. Each of the one or more classifications indicates whether an associated regressor is a valid regressor. The example method also includes identifying, for each of the one or more regressors, whether the regressor is valid based on the associated classification. The example method further includes outputting the one or more regressors. Outputting the one or more regressors includes preventing any regressor identified as not valid from being output.

Another innovative aspect of the subject matter described in this disclosure can be implemented in a system for generating regressors using a machine learning model. An example system includes one or more processors and a memory storing instructions that, when executed by the one or more processors, cause the system to perform operations. The operations include obtaining a plurality of time series datasets for a period of time. The operations also include providing the plurality of time series datasets to an RNN of an ML model. The operations further include generating, by the RNN, one or more outputs associated with one or more time series datasets of the plurality of time series datasets. The operations also include providing a first portion of the one or more outputs to a regressor layer of the ML model. The operations further include providing a second portion of the one or more outputs to a classification layer of the ML model. The operations also include generating, by the regressor layer, one or more regressors for the one or more time series datasets. The operations further include generating, by the classification layer, one or more classifications associated with the one or more regressors. Each of the one or more classifications indicates whether an associated regressor is a valid regressor. The operations also include identifying, for each of the one or more regressors, whether the regressor is valid based on the associated classification. The operations further include outputting the one or more regressors. Outputting the one or more regressors includes preventing any regressor identified as not valid from being output.

In some implementations, each classification provided by the classification layer is based on a sparsity of data in the associated time series data set. In some further implementations, the regressor layer is associated with a first loss function, the classification layer is associated with a second loss function, and training the regressor layer and the classification layer is based on a combined loss function including the first loss function and the second loss function. Such regressors may include a prediction of future user spending in a category, and the plurality of time series data may include a history of user spending in a plurality of categories.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
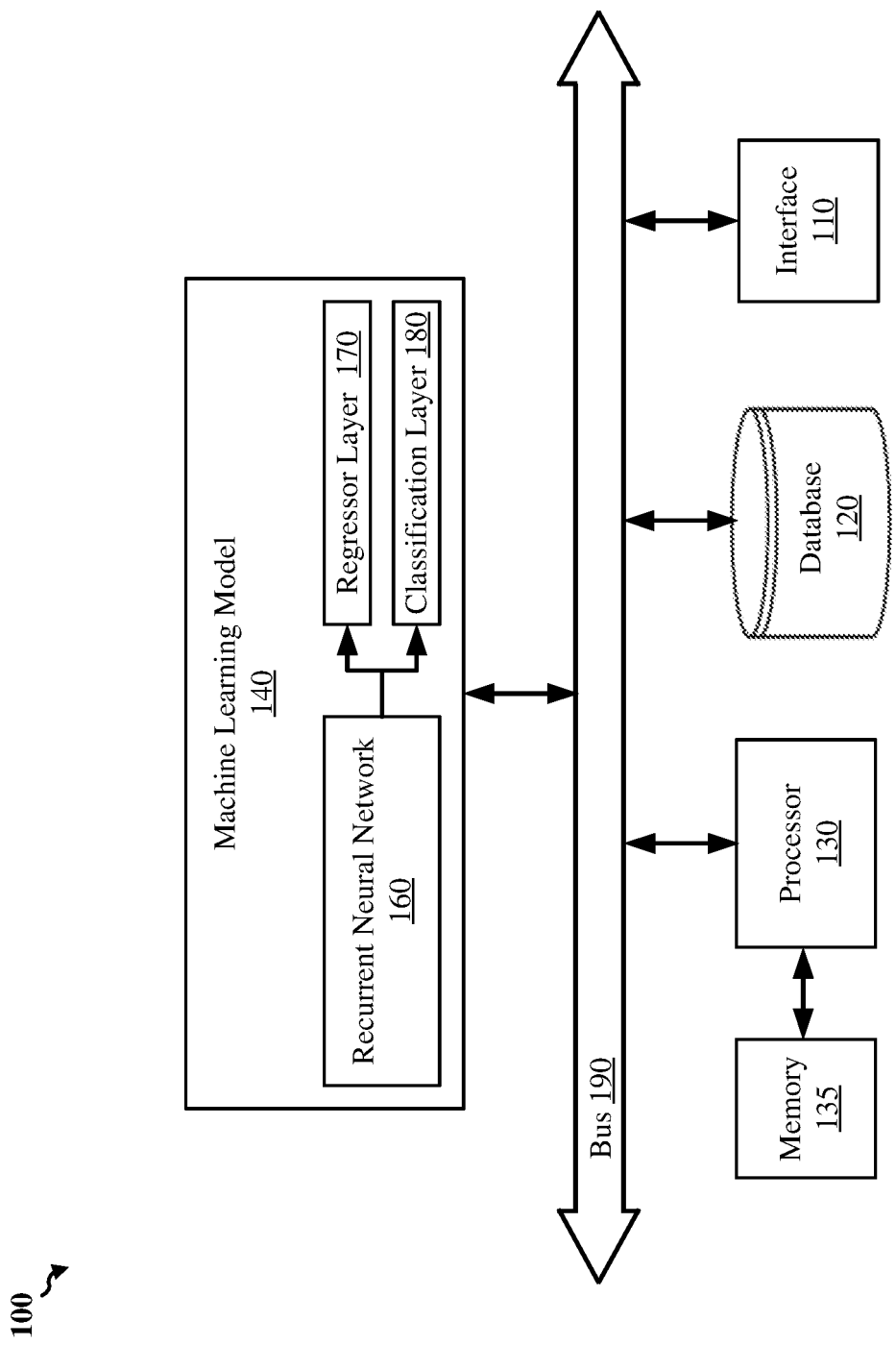
FIG. 1 shows an example system to generate one or more regressors using a machine learning (ML) model, according to some implementations.

Implementations of the subject matter described in this disclosure may be used to generate regressors based on time series data, which may include sparse datasets. As used herein, a regressor may refer to any variable that may be used to or interpreted as a prediction of some variable or other object. A machine learning model is used in many real world applications to generate regressors of desired information. For example, machine learning models may be used by geological services to predict earthquake locations and timing, may be used by weather forecasting services to predict hurricane trajectories and speeds, may be used by a real estate agent to predict an optimum asking price of a house to be placed on the market, may be used by an insurance actuarial to predict car insurance costs, may be used by a city planner or other municipality entity to predict traffic flow and congestion, and so on. For many entities, a machine learning model may be used to predict upcoming spending.

For example, various financial management applications exist that are able to keep track of spending across a plurality of financial accounts for a user. In one specific example, the Intuit® Mint application allows a user to link the user's bank accounts, credit card accounts, mortgage accounts, and other types of financial accounts. The application aggregates records regarding recent transactions from each of the accounts (such as for each mortgage payment, new credit card or debit card transactions, deposits to an account, and so on). The application also provides the user the ability to manually enter transactions (such as for payments made in cash). The application attempts to categorize the spending transactions (i.e., money out transactions) and income transactions (i.e., money in transactions) into different categories. For example, income may be categorized into categories including "paycheck," "investment," "returned purchase," "interest income," and so on. Spending may be categorized into categories including "entertainment," "education," "shopping," "personal care," "health and fitness," "food and dining," "bills and utilities," "fees and charges," "taxes," and so on. Each category may be further divided into subcategories, and any additional levels of subcategories may exist for different subcategories. For example, a "taxes" category may be further divided into "federal tax," "state tax," "local tax," "sales tax," and "property tax" subcategories. As used herein, a category may refer to any level of category or subcategory.

In categorizing user spending into different categories, the application is configured to keep track of user spending over time in the different categories. Through keeping track and indicating spending in different categories, the application may notify a user in changes to spending. Of particular interest to many users is the ability to predict changes in user spending in one or more categories. For example, a user on a fixed income may be dependent on reliably knowing upcoming expenses and budgeting for such. Changes in food prices, gas prices, infrequent or sporadic bills or fees (such as car repair bills), or other types of spending may cause difficulty in knowing future spending habits in order to set a budget and be prepared for such spending. As such, it is beneficial for such applications to be associated with predictive logic to predict future spending in various spending categories in order to assist users with being aware of potential future spending. A machine learning (ML) model may be used to predict user spending in various categories.

Various types of machine learning models exist. Machine learning models may be based, e.g., on one or more of decision trees, random forests, logistic regression, nearest neighbors, classification trees, control flow graphs, support vector machines, naïve Bayes, Bayesian Networks, value sets, hidden Markov models, or neural networks configured to generate regressors for the intended purpose. One category of neural networks is recurrent neural networks (RNNs). An RNN uses a history of past data to impact a decision (such as a future prediction) based on current data. In this manner, time series datasets may be provided to the RNN for the RNN to predict a future point of the time series datasets or to otherwise make a decision. For example, time series datasets of user spending in various categories (as well as other financial time series data) may be provided to the RNN to predict whether the user is to spend more in a specific category.

ML model predictions (such as regressors output by the ML model) are impacted by the amount of data available to be provided to the ML model. For example, as the amount of spending data to be provided to the ML model increases, the accuracy of the regressors may increase. If data to be input to the ML model is sparse, regressors output by the ML model may not be accurate. For example, a family that rarely goes to restaurants and otherwise does not eat out may have very few spending transactions categorized into a "restaurants" spending category. As such, the time series dataset for the "restaurants" category may be considered sparse (such as having a large majority of daily datapoints of the time series dataset for the category being zero/nonexistent). As a result of the sparse time series dataset, any prediction regarding the "restaurants" category may not be reliable. If a user is provided one or more unreliable predictions on future spending, the user may set an incorrect budget or otherwise incorrectly assume a total future spending. As such, there is a need to be able to identify which predictions (regressors) from an ML model are unreliable, which may be caused by data sparsity provided to the ML model. If a regressor is found to be unreliable, the regressor may not be indicated to the user or may be identified as being unreliable for the user's awareness. To note, while many of the examples herein are described with reference to identifying which regressors of user spending in a plurality of categories are reliable or unreliable (also referred to as "valid" or "invalid") for clarity, the example implementations herein are to be used for any potentially sparse time series datasets.

Various implementations of the subject matter disclosed herein provide one or more technical solutions to the technical problem of generating valid regressors using a machine learning (ML) model. In some implementations, a computing system is configured to obtain a plurality of time series datasets for a period of time. The computing system is also configured to provide the plurality of time series datasets to a recurrent neural network (RNN) of an ML model. The RNN is configured to generate one or more outputs associated with one or more time series datasets of the plurality of time series datasets. The computing system is further configured to provide a first portion of the one or more outputs to a regressor layer of the ML model and provide a second portion of the one or more outputs to a classification layer of the ML model. The regressor layer is configured to generate one or more regressors for the one or more time series datasets, and the classification layer is configured to generate one or more classifications associated with the one or more regressors (with each of the one or more classifications indicating whether an associated regressor is a valid prediction). The computing system is also configured to identify, for each of the one or more regressors, whether the regressor is valid based on the associated classification and output the one or more regressors (with outputting the one or more regressors including preventing any regressor identified as not valid from being output). To note, each classification provided by the classification layer may be based on a sparsity of data in the associated time series dataset. As such, a user may be prevented from receiving an unreliable regressor based on sparse data provided to the ML model. In a specific example, regressors may include predictions of future user spending in different categories, and the plurality of time series datasets includes a history of user spending in a plurality of categories. In this manner, the computing system may be configured to identify reliable and unreliable predictions on user spending in one or more categories.

As used herein, a user may refer to an individual, a business, or any other entity. The examples herein depict users as individuals for clarity in explaining aspects of the present disclosure, but any suitable user may be used. While many of the examples are described regarding identifying the validity/invalidity of predicted future user spending, the present disclosure is envisioned to cover other scenarios, such as identifying the validity/invalidity of predicted weather patterns, population changes, or any other time series datasets that may be sparse. In addition, while the disclosure describes generating and validating regressors, which may be associated with some form of regression, the regressor is not required to be a product of a regression model or any other specific sort of model to generate outputs for prediction (such as spending amounts for various spending categories). Regressor may be used interchangeably herein with prediction or predictor.

Various aspects of the present disclosure provide a unique computing solution to a unique computing problem that did not exist prior to the creation of machine learning models. As such, implementations of the subject matter disclosed herein are not an abstract idea such as organizing human activity or a mental process that can be performed in the human mind. Training a machine learning model and using the machine learning model to perform its intended task cannot be performed in the human mind, much less using pen and paper.

FIG. 1 shows an example system 100 to generate one or more regressors using an ML model, according to some implementations. For example, the system 100 may be configured to generate, identify, and output one or more valid predicted time series datapoints generated by an ML model based on the density of the time series datasets input into the ML model. The system 100 includes an interface 110, a database 120, a processor 130, a memory 135 coupled to the processor 130, and an ML model 140. In some implementations, the various components of the system 100 may be interconnected by at least a data bus 190, as depicted in the example of FIG. 1. In other implementations, the various components of the system 100 may be interconnected using other suitable signal routing resources.

The interface 110 may be one or more input/output (110) interfaces to obtain time series data and provide one or more regressors generated by the system 100. An example interface may include a wired interface or wireless interface to the internet or other means to communicably couple with user devices or other devices. In some implementations, the interface 110 may include an interface with an ethernet cable or a wireless interface to a modem, which is used to communicate with an internet service provider (ISP) directing traffic to and from devices of a user or other institutions. In the example of spending regressors for a financial management application, the application may be hosted locally on the system 100 or may be hosted remotely on another system. If hosted locally, the interface 110 may obtain transactions from one or more financial institutions. If hosted remotely, the interface 110 may obtain transactions from the system 100 hosting the application.

In some implementations regarding the financial management application, the time series datasets to be obtained and used in generating one or more regressors may include a time series dataset for each of a plurality of spending categories. The time series datasets obtained may also include time series datasets other than those related to spending, such as time series datasets regarding income, current available funds or assets, and so on. In this manner, predicting future spending in one or more categories may be based on more than the time series datasets for those one or more categories. As noted above, though, any type of time series data may be used in the example implementations described herein, and the present disclosure is not limited to predicting spending habits of a user.

The time series datasets may be of any suitable fidelity and for any suitable amount of time. For example, the interface 110 may obtain the last year's worth of daily data points for a plurality of spending categories. In addition, the interface 110 may obtain daily data points of other types of transactions, such as income. In some implementations, obtaining the time series datasets may include filling in the time series datasets with zero values for entries with no transactions. For example, if a spending category includes transactions for 100 days over a year, zeros may be used for the other 265 days of the year with no transactions. While daily data points are described, other datapoints may be used, such as hourly, weekly, monthly, yearly, and so on. While a year is described for a period of time over which to obtain data points is described, any period of time may be used, such as a day, a week, a month, half a year, a decade, and so on. In some implementations, the fidelity of the datasets and the period of time may be static or may vary based on the data to be predicted by the system 100, a user input, or other factors.

The obtained time series datasets may be provided to the ML model 140 to generate one or more regressors regarding the time series datasets. For example, the ML model 140 may generate one or more regressors and identify which regressors are valid based on a sparsity of the datasets provided to the ML model 140. In some implementations, the interface 110 provides such regressors. In some implementations, the system 100 may use the regressors to make one or more further predictions. For example, the system 100 may predict trends in overall spending, future funds availability, and so on from the regressors. The interface 110 may provide such regressors.

As noted above, the interface 110 may be configured to provide one or more regressors. If the system 100 is remote to a user (such as the system 100 being part of an online service provided to the entity), the system 100 may provide indications of the regressors via the internet or a network to the user or to another device associated with providing the service to the user. If the system 100 is local to the user (such as the system 100 being a personal computer or other system), the interface 110 may include a display, a speaker, a mouse, a keyboard, or other suitable input or output elements that allow interfacing with the user to provide one or more indications of the regressors to the user.

The database 120 may store the time series datasets. The database 120 may also store one or more outputs of the ML 140 (which may include one or more of outputs of the RNN 160, regressors by the regressor layer 170, or classifications by the classification layer 180), one or more applications to be executed by the system 100, one or more configurations for the ML model 140, or other information that may be used for operation of the system 100. In some implementations, the database 120 may include a relational database capable of presenting information as data sets in tabular form and capable of manipulating the data sets using relational operators. The database 120 may use Structured Query Language (SQL) for querying and maintaining the database 120. While the examples herein depict operations to be performed by the system 100 with reference to one user for clarity purposes, the system 100 may be configured to perform operations associated with any number of users (such as generating regressors for a plurality of users).

The processor 130 may include one or more suitable processors capable of executing scripts or instructions of one or more software programs stored in system 100 (such as within the memory 135). For example, the processor 130 may be capable of executing one or more applications or the ML model 140. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications or the ML model 140 that may be executed by the processor 130. The memory 135 may also store the obtained time series datasets and/or any outputs of the ML model 140 (such as regressors and/or classifications). In some implementations, hardwired circuitry may be used in place of, or in combination with, software instructions to implement aspects of the disclosure. As such, implementations of the subject matter disclosed herein are not limited to any specific combination of hardware circuitry and/or software.

The ML model 140 may be configured to generate, and identify as whether valid, one or more data points for one or more time series datasets. As noted above, the system 100 obtains a plurality of time series datasets and provides the time series datasets to the ML model 140. Example time series datasets may include a first group of datasets associated with user spending, with each dataset being associated with a different category. For example, a first dataset of the first group may be a time series of daily data points associated with an "entertainment" category, a second dataset of the first group may be a time series of daily data points associated with a "personal care" category, and so on. The example time series datasets may also include a second group of datasets not associated with user spending categories. For example, a dataset of the second group may be a time series associated with income, a daily account balance, or other time series data that may be useful in generating one or more regressors.

As depicted in FIG. 1, the ML model 140 may include a recurrent neural network (RNN) 160, a regressor layer 170, and a classification layer 180. The depicted arrangement of the regressor layer 170 and the classification layer 180 as following the RNN 160 is only for illustrative purposes. In some other implementations, the layers 170 and 180 may be included in the RNN 160. As used herein, a "layer" may refer to any components or grouping of components in order to perform the operations described herein for the respective layers. For example, the regressor layer 170 and the classification layer 180 may be any suitable portions in the RNN 160 or attached to the RNN 160. The layers 170 and 180 may be separate ML engines or included as portions of another ML engine (such as being part of the RNN 160). To note, the layers 170 and 180 may be mutually exclusive of each other (and thus having no overlapping components), or the layers 170 and 180 may overlap such one or more components are included in both layers. An example ML model 140 (including the RNN 160) is described in more detail below with reference to FIGS. 2 and 3 for clarity in explaining aspects of the present disclosure. However, any suitable configuration of an ML model 140 may be used to perform aspects of the present disclosure.

Regarding the RNN 160, any suitable RNN may be used. In some implementations, the RNN includes a long-short term memory (LSTM) network in which the network includes a plurality of LSTM units. In some other implementations, the RNN may include gated recurrent units (GRUs) or any other types of units with a memory. The RNN 160 is described herein as generating outputs provided to the regressor layer 170 and the classification layer 180. The outputs of the RNN 160 may include values output externally by the RNN 160 or may include values internal to the RNN 160. For example, the outputs may be values internal to the RNN 160 in which a portion of the outputs are provided to the regressor layer 170 and a portion of the outputs are provided to the classification layer 180. The combined operations of the RNN generating outputs and the layers generating outputs refers cumulatively to the ML model 140 generating regressors and associated classifications for one or more time series datasets.

Referring to the layers 170 and 180, the regressor layer 170 generates regressors for one or more time series datasets. For example, for a first time series, the regressor layer 170 may predict a next data point or a data point further into the future (with the data point being the regressor). To note, the regressor layer 170 may not generate a regressor for each and every time series. For example, 16 time series datasets regarding spending for 16 different categories may be input to the ML model 140, with the regressor layer 170 to generate regressors for each of the time series. However, other time series datasets (such as for income categories, time series regarding assets, and so on) may also be input into the ML model 140 for which the regressor layer 170 is not to generate any regressors. As such, the ML model 140 may receive X time series datasets (for any suitable integer X greater than 1), and the ML model 140 may generate a regressor for each of Y time series datasets included in the X time series datasets (for integer Y greater than or equal to 1 and less than or equal to X).

The classification layer 180 generates, for each regressor generated by the regressor layer 170, a classification associated with the regressor. In some implementations, the classification is a metric to indicate the validity of the generated regressor. For example, the classification may be a confidence (such as a percentage from 0 to 1 or a binary value of 0 or 1) indicating the reliability of the regressor. Such classifications indicating the reliability of regressors may be based on the sparsity of data provided to the ML model 140. For example, the sparser the data provided to the ML model 140, the lower the confidences that may be provided by the classification layer 180. Conversely, the less sparse the data provided to the ML model 140, the higher the confidences that may be provided by the classification layer 180. To note, while reliability of a regressor/prediction for a time series is based on a sparsity of that time series dataset, the reliability of the regressor may also be based on the sparsity of other time series datasets that may impact the time series. As such, sparsity and reliability may be based on any portion of the data that is to be provided to the ML model 140 for generating one or more regressors. With associated classifications for each regressor, the system 100 is able to identify which regressors are considered reliable or valid and which regressors are considered unreliable or invalid. Valid regressors may be output for indication to a user or for use in further processing (such as generating spending trends or budgets). Invalid regressors may be excluded from output, such as not being provided to the user or used in further processing. In this manner, a user may be made aware of reliable regressors while not being inundated with unreliable regressors.

The ML model 140 is to be trained before use (or retrained during use) in generating one or more regressors and in generating one or more classifications associated with the one or more regressors. Training is based on previous or current time series data, with succeeding data points in the time series data being used as labeled datasets for supervised learning regarding the regressors by the regressor layer 170. Labeled datasets may also exist for supervised learning regarding the classifications by the classification layer 180 (such as being manually generated for training or automatically generated based on the sparsity of one or more time series (such as the percentage of 0 data points across one or more time series datasets)). However, any suitable form of suitable or unsupervised training may be used to train the ML model 140. In some implementations, the regressor layer 170 is associated with a first loss function, and the classification layer 180 is associated with a second loss function. To ensure synergy between the regressor layer 170 and the classification layer 180, the layers 170 and 180 are to be trained using a common loss function. The common loss function may be a combination of the first loss function associated with the regressor layer 170 and of the second loss function associated with the classification layer 180. Example training of the ML model 140 is described in more detail below after describing possible implementations of the ML model 140.

The ML model 140 (or portions thereof) may include software including instructions stored in memory 135 or the database 120, may include application specific hardware (e.g., one or more ASICs), or may include a combination of the above. As such, the particular architecture of the system 100 shown in FIG. 1 is but one example of a variety of different architectures within which aspects of the present disclosure may be implemented. For example, in other implementations, components of the system 100 may be distributed across multiple devices, may be included in fewer components, and so on. While the below examples are described with reference to system 100, any suitable system may be used to perform the operations described herein.

Figure 2:
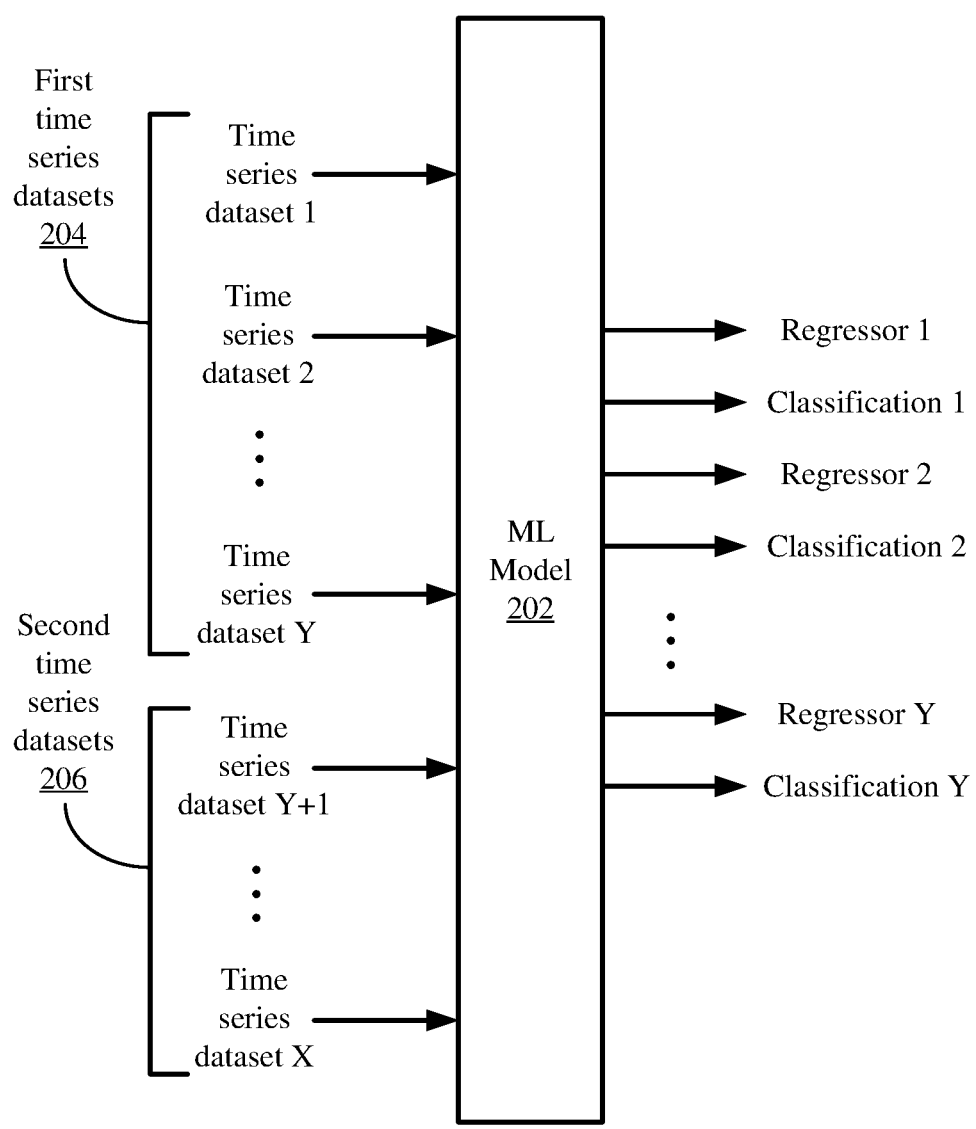
FIG. 2 shows an example depiction of an input and output set to and from an ML model configured to handle sparse time series data, according to some implementations.

FIG. 2 shows an example depiction 200 of an input and output set to and from an ML model 202 configured to handle sparse time series data, according to some implementations. The ML model 202 may be an example implementation of the ML model 140 in FIG. 1. As noted above, a plurality of time series datasets may be provided to the ML model 140. From the plurality of time series datasets, the ML model is to generate one or more regressors and one or more classifications indicating the validity of the one or more regressors.

As depicted in FIG. 2, the ML model 202 receives a first group of time series datasets 204. The first group of time series datasets 204 includes time series datasets 1 through Y (for integer Y greater than or equal to 1). For each time series dataset of the first group of time series datasets, the ML model 202 is to generate a regressor and an associated classification as to the validity of the regressor. For example, for time series dataset 1, the ML model 202 generates regressor 1 and classification 1; for time series dataset 2, the ML model 202 generates regressor 2 and classification 2; and so on up to for time series dataset Y, the ML model 202 generates regressor Y and classification Y.

In a specific example in which the ML model 202 is to generate a regressor/prediction as to user spending in one or more categories, each of the time series datasets 1 through Y may be, e.g., daily measurements of the last six months of spending for a specific spending category (such as time series dataset 1 including daily amounts on spending on restaurants, time series dataset 2 being daily amounts on spending on transportation, and so on). As such, each time series dataset 1 through Y includes Q data points (for any suitable integer Q to cover a period of time), and the ML model 202 is to predict the Q+1 data point for each time series dataset and identify a validity of the Q+1 data point that is predicted.

In addition to the first group of time series datasets 204, the ML model 202 may also receive a second group of time series datasets 206 for which the ML model 202 is not to generate a regressor. Such datasets may be related to the first group of datasets to assist in training the ML model 202 and generating a regressor, but a regressor of such datasets is not desired or needed at the moment. For the example of predicting user spending in one or more categories, the second group of time series datasets 206 may be associated with spending categories for which a regressor is not to be generated, may be associated with income categories, or may be associated with other information (such as weather, day of the week, time of the year, and so on) for which a regressor is not desired or needed. As depicted, the second group of time series datasets 206 may include time series datasets Y+1 through X (for integer X greater than or equal to Y). In this manner, the ML model 202 may be trained based on the time series datasets 1 through X to generate regressors for the time series datasets 1 through Y. To note, if X equals Y, the ML model 202 is to generate a regressor and classification for each and every time series dataset received by the ML model 202.

As noted, the ML model 202 may include any suitable machine learning engine or combination of machine learning engines to generate regressors and classifications. In some implementations, the ML model 202 may include a recurrent neural network (RNN). The RNN may include any suitable memory units and be configured in any suitable manner. In some implementations, the RNN includes two layers of LSTM units, and each layer includes 528 LSTM units. However, the RNN may include any suitable number of layers (such as three or more), any suitable number of units (such as less than or more than 528), or any suitable type of units (such as GRUs or other memory units).

Figure 3:
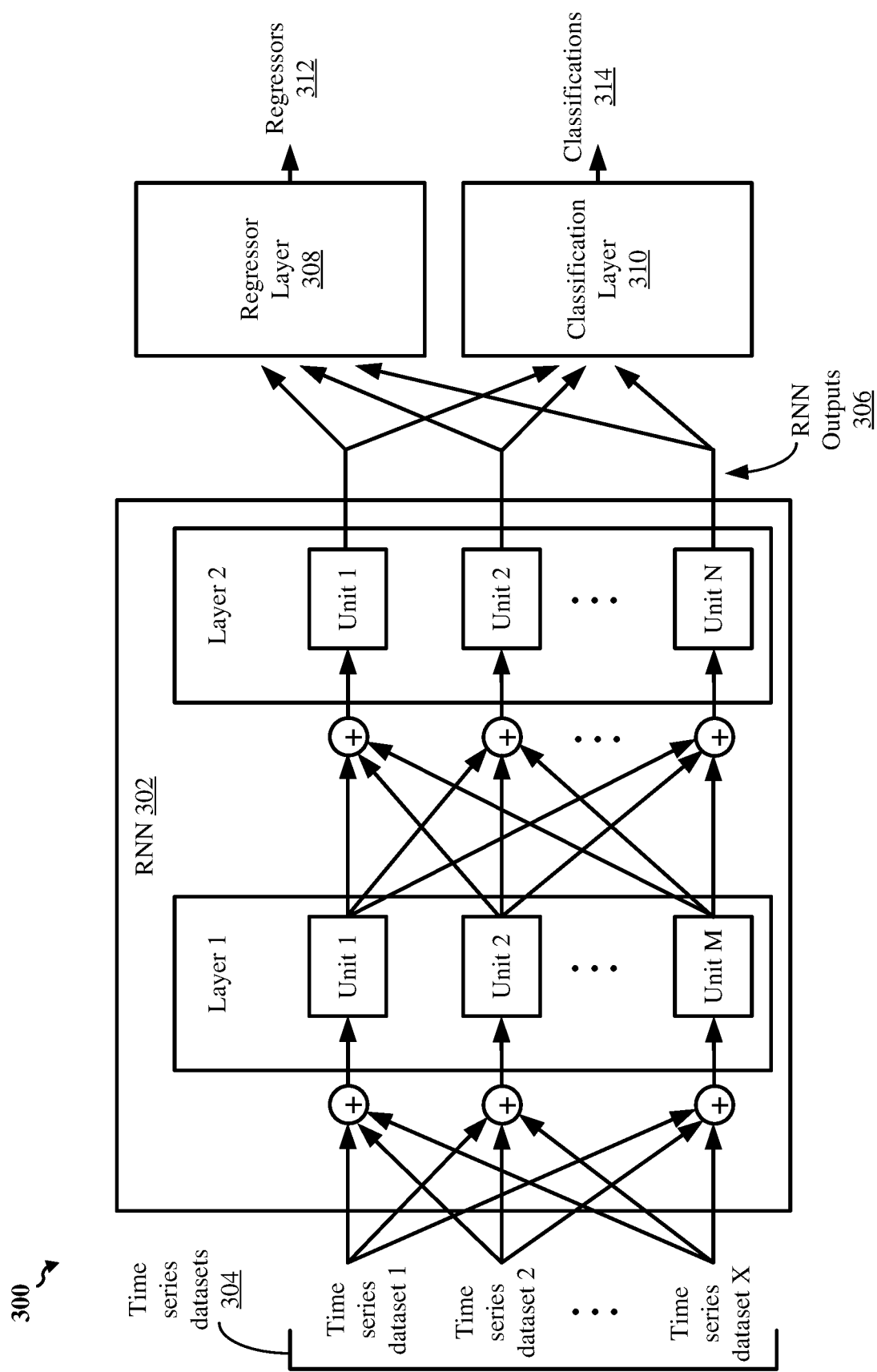
FIG. 3 shows an example configuration of the ML model in FIG. 2, according to some implementations.

FIG. 3 shows an example configuration 300 of the ML model 202 in FIG. 2, according to some implementations. The example configuration 300 of the ML model 202 includes an RNN 302, a regressor layer 308, and a classification layer 310. The RNN 302 is configured to receive the time series datasets 304 (including time series datasets 1 through X) and generate outputs 306. The RNN 302 includes a layer 1 of units M and a layer 2 of units N (for integers M and N, which may be equal or different). For example, the RNN 302 may include an LSTM layer 1 of 528 LSTM units and an LSTM layer 2 of 528 LSTM units. To note, the combinatorial logic to combine the time series datasets for input into the units of layer 1 and the units of layer 2 may be configured in any suitable manner during training. While not depicted in FIG. 3, each unit may include a feedback such that a previous output of the unit is an input to the unit. For example, when the time series data points p(t) are being provided input to the ML model (for time series datasets including data points p(1) to p(Q) and t being between 1 and Q), each LSTM unit may include a feedback to receive the output generated for data points p(t−1). Also to note, while not shown in FIG. 3, the RNN 302 may include combinatorial logic to combine the outputs of the units 1 through N of layer 2 to generate the RNN outputs 306. While only two layers are depicted, the RNN may include any suitable number of layers.

The regressor layer 308 receives the RNN outputs 306 and generates the regressors 312. The classification layer 310 receives the RNN outputs 306 and generates the classifications 314 associated with the regressors 312. In some implementations, the layers 308 and 310 may be the combinatorial logic after the last layer of the RNN 302 to generate the regressors and the classifications. In some other implementations, the layers 308 and 310 may be separate machine learning engines or algorithms from the RNN in order to generate the regressors 312 and classifications 314.

To note, though, the regressor layer 308 and the classification layer 310 are depicted as being separate from the RNN 302 for clarity only in explaining aspects of the present disclosure. In some implementations, the regressor layer 308 and the classification layer 310 are included in the RNN 302. For example, the regressor layer 308 may include a first portion of units (such as a first subset of LSTM units) and their associated combinatorial logic, and the classification layer 310 may include a second portion of units (such as a second subset of LSTM units and their associated combinatorial logic. In this manner, the RNN outputs 306 may be internal to the RNN that are provided to the first subset of units and the second subset of units. For example, the RNN may generate a plurality of outputs internal to the RNN 302. A first portion of the plurality of outputs may be provided to the components making the regressor layer 308 (such as the first subset of LSTM units of the regressor layer), and a second portion of the plurality of outputs may be provided to the components making the classification layer 310 (such as the second subset of LSTM units of the classification layer). To note, the layers 308 and 310 may be any portion of the RNN 302 or components outside the RNN 302, and the layers may include components exclusive to that layer, or the layers may share components. As such, the present disclosure is not limited to the example ML model configuration depicted in FIG. 3. Generating one or more regressors and identifying which regressors are valid are described with reference to the ML models depicted in FIGS. 1-3 exclusively for clarity purposes.

Figure 4:
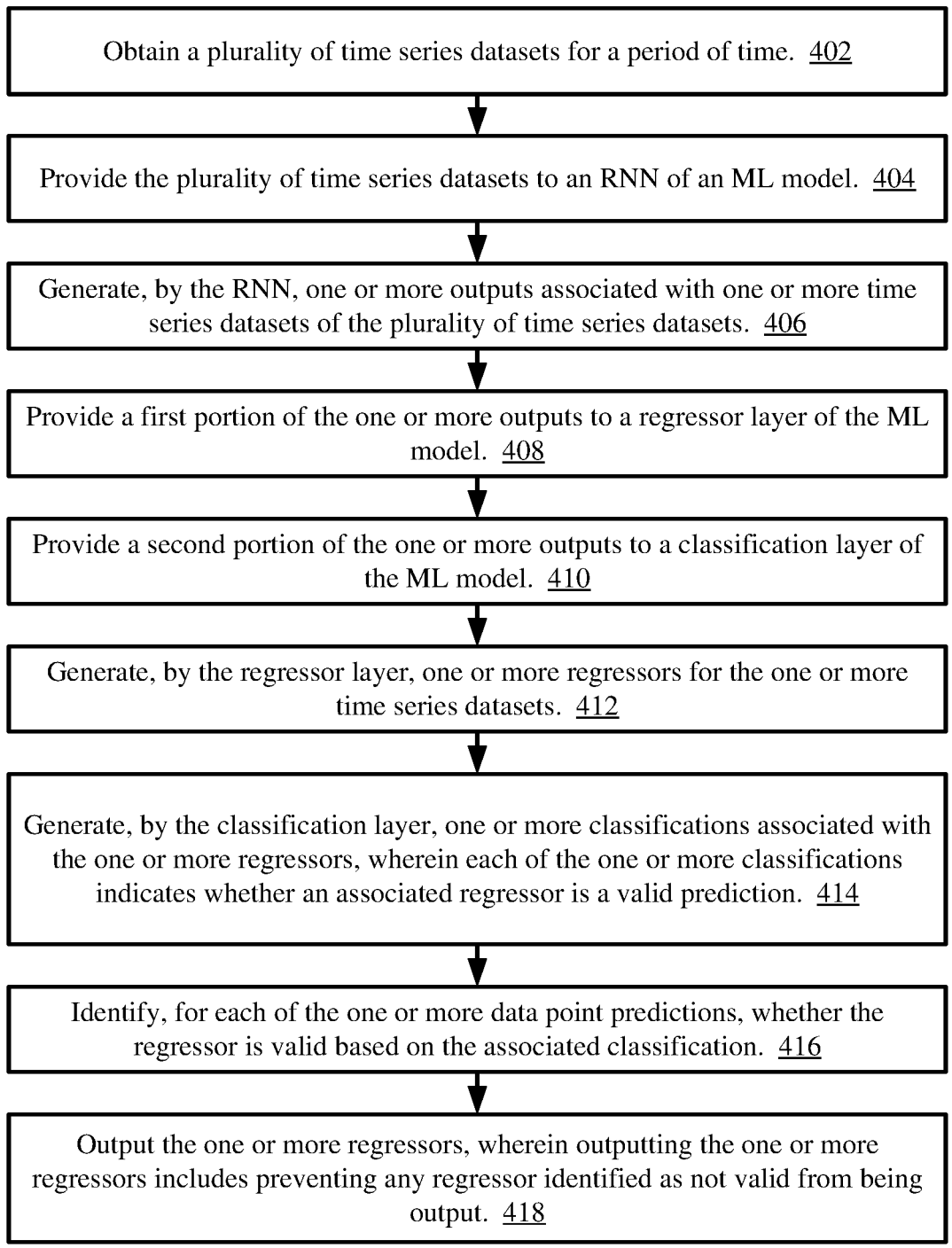
FIG. 4 shows an illustrative flow chart depicting an example operation for generating one or more valid regressors using an ML model, according to some implementations.

FIG. 4 shows an illustrative flow chart depicting an example operation 400 for generating one or more valid regressors using an ML model, according to some implementations. At 402, the system 100 obtains a plurality of time series datasets for a period of time. For example, the interface 110 may receive time series datasets 1-X, with each dataset including 1-Q data points. The interface 110 may receive the datasets from another system storing the datasets, or the interface 110 may receive information form one or more other systems in order for the system 100 to create the datasets. In a specific example, the system 100 may obtain different time series datasets associated with user spending for different spending categories as well as additional time series datasets that may be related to the spending categories (such as income, weather, day of the week, etc.). The interface 110 may receive the time series datasets from a system hosting a financial management application (such as for the Intuit Mint application). Alternatively, the interface 110 may receive information from various financial entities (such as banks, mortgage companies, credit card companies, etc.) in order for the system 100 to create the time series datasets.

As noted above, the related additional time series datasets (such as income or other datasets) for which the system 100 is not to generate a regressor may be useful by the ML model 140 to generate a regressor for one or more other time series datasets. For example, if income increases, spending in some categories (such as restaurants, shopping, investing, etc.) may increase. In another example, the time of the year (such as closer to Christmas) may also impact spending in some categories. In a further example, increased spending in some categories (such as automobile repairs or bills) may cause a decrease in spending in some categories (such as restaurants, shopping, investing, etc.). As such, the time series datasets obtained by the system 100 may include more datasets than the datasets for which a regressor is to be generated.

The fidelity and period of time of the time series datasets may be any suitable fidelity and period of time. For example, spending for various categories may be associated with a time series dataset including daily data points over the last six months. However, hourly, weekly, monthly, or another fidelity may be used, and/or the last month, three months, one year, five years, or another period of time may be used. In some implementations of obtaining a time series dataset, some data points may be missing from the time series dataset. For example, for restaurant spending over the last six months, a user may have spending for 25 days of the last six months (with no spending during the remainder of the last six months). In obtaining the time series dataset, the system 100 may fill the time series dataset with zeros for days without values At 404, the system 100 provides the plurality of time series datasets to the RNN 160 of the ML model 140. For example, referring to FIG. 3, the time series datasets 1-X (with the ML model to generate regressors and classifications for time series datasets 1-Y) may be provided to the RNN 302. At 406, the RNN 160 generates one or more outputs associated with one or more time series datasets of the plurality of time series datasets. For example, the RNN 302 may generate outputs 306 associated with time series datasets 1-Y for which the ML model is to generate a regressor and a classification. As noted above, the RNN outputs may be internal to the RNN if the regressor layer and the classification layer is included in the RNN, or the RNN outputs may be external to the RNN if the regressor layer and the classification layer is external to the RNN.

At 408, the system 100 provides a first portion of the one or more outputs to a regressor layer of the ML model. For example, the regressor layer 308 may receive at least a portion of the RNN outputs 306. To again note, while the regressor layer 308 is depicted as being outside of the RNN 302, the regressor layer 308 may be included in the RNN 302, may be external to the RNN 302, or may be a combination of both. At 410, the system 100 provides a second portion of the one or more outputs to a classification layer of the ML model. For example, the classification layer 310 may receive at least a portion of the RNN outputs 306. To again note, while the classification layer 310 is depicted as being outside of the RNN 302, the classification layer 310 may be included in the RNN 302, may be external to the RNN 302, or may be a combination of both. Components of the classification layer 310 may be exclusive of the regressor layer 308, or some components of the classification layer 310 may be included in the regressor layer 308. Each of the first portion and the second portion of the RNN outputs may be any subset or all of the RNN outputs. The first portion of RNN outputs provided to the regressor layer and the second portion of the RNN outputs provided to the regressor layer may differ, may be the same, or may overlap in any manner.

At 412, the regressor layer generates one or more regressors for the one or more time series datasets. For example, the regressor layer may generate regressors 1-Y for time series datasets 1-Y. If the time series datasets include data point 1-Q, the regressors 1-Y may be for data point Q+1 for the time series datasets. At 414, the classification layer generates one or more classifications associated with the one or more regressors. Each of the one or more classifications indicates whether an associated regressor is a valid regressor. For example, the classification may include a confidence in the validity of the regressor. The confidence may be a percentage (such as from 0 to 1) or any other metric to measure the validity of the regressor. As noted above, the classification may be based on the sparsity of data in the time series dataset associated with the regressor. For example, if a time series dataset of daily user spending over the last six months includes only six data points, the classification associated with the predicted user spending for the time series dataset may be a low confidence. As the time series dataset includes more datapoints (and the dataset has less sparsity), the confidence in a regressor may increase. In some implementations, the classification may also be based on the sparsity of other datasets that impact the regressor associated with the classification.

At 416, the system 100 identifies, for each of the one or more regressors, whether the regressor is valid based on the associated classification. In some implementations of identifying whether a regressor is valid, the system 100 may compare the classification to a predetermined threshold. For example, the threshold may be a predefined threshold to indicate whether the regressor is valid. If the classification is greater than the predetermined threshold, the system 100 identifies the regressor as valid. If the classification is less than the predetermined threshold, the system 100 identifies the regressor as not valid. In a specific example, the classification is in a range from 0 to 1, and the predetermined threshold is 0.5. However, the classification may be in any suitable range, and the predetermined threshold may be any suitable value (such as 0.9 or another suitable threshold). The predetermined threshold may be determined in any suitable manner. For example, the threshold may be pre-defined or pre-selected by a developer for the system 100 (such as being preset to 0.5, 0.9, or another suitable percentage). Additionally or alternatively, the threshold may be adjustable, such as being adjusted by a user or being adjusted based on comparison of the regressors with later data points obtained for the time series datasets. For example, if a daily regressor is generated, after the next day, the data point associated with the regressor may be obtained for a time series dataset. The obtained data point and the predicted data point may be compared, and any difference may be used to determine whether the threshold is to be adjusted (such as the difference between the actual data point and the predicted data point being greater than a tolerance for a last number of data points of the time series dataset). To note, the threshold may be the same for all time series datasets or may differ depending on the time series dataset.

At 418, the system 100 outputs the one or more regressors. Outputting the one or more regressors includes preventing any regressor identified as not being valid from being output. For example, the system 100 may generate 16 regressors of user spending for 16 different spending categories. Typically, the system 100 may provide the regressors to the user for awareness or upon request, or the system 100 may provide the regressors for further processing (such as to define trends in user spending, attempt to identify a cash flow issue for the user, or for other predictions or uses). If a regressor is associated with a low confidence that the regressor is accurate, such regressors may not be shared with the user or with another system to prevent the user's decision making or the system's processing of the regressors from being influenced by unreliable regressors.

In some implementations of preventing a regressor from being output, the system 100 may replace the regressor with a 0 based on a classification associated with the regressor being less than the predetermined threshold. In this manner, the 0 may indicate that the regressor that was generated is not reliable or may otherwise be used to not influence processing of the regressors. However, any other suitable means of excluding the regressor may be used, such as by not outputting any value for the time series dataset, outputting an error or other indicator, or identifying the regressor as unreliable and separated from the reliable regressors provided by the system 100. In this manner, unreliable regressors may not negatively influence decisions made based on the regressors.

Before the ML model 140 may generate one or more regressors and one or more associated classifications, the ML model 140 is to be trained. For example, for the RNN 302, one or more of the weights of each unit is to be determined, the weights of the outputs as inputs between layers may be determined, the weights of outputs of multiple units from a previous layer to be combined as an input to a current layer's unit may be determined, the weights of the outputs 306 to be combined for the layers 308 and 310 may be determined, and so on. Training the ML model 140 may be via supervised or unsupervised learning, and training the ML model 140 (as with any ML model) may be based on a loss function.

Since the ML model 140 is to generate regressors and separate classifications, the ML model 140 is to generate two separate types of output. As a result, each type of output is associated with its own loss function for training. For example, the regressor layer may be associated with a first loss function, and the classification layer may be associated with a second loss function. Training using the first loss function may be associated with minimizing the difference between the predicted data points and the actual data points, and training using the second loss function may be associated with minimizing the difference between the classifications and the actual reliability of the data. To note, any suitable loss function may be used. For example, the first loss function may be a mean square error (MSE). Other examples may include a mean absolute error (MAE), mean bias error (MBE), a hinge loss function, or a negative log likelihood. The second loss function may also be any suitable loss function. For example, the second loss function may be a log loss function or an inverse log loss function. Other examples may include a binary cross entropy loss function or a hinge loss function.

In order to train the ML model 140 based on the first loss function and the second loss function, a combined loss function including the first loss function and the second loss function may be used. Any suitable combination of the first and second loss functions may be used for the combined loss function. In some implementations, the combination of the first loss function and the second loss function is a weighted addition of the first loss function and the second loss function, such as depicted below is equation (1):

$$\text{Combined Loss Function} = A*\text{First Loss Function} + B*\text{Second Loss Function} \quad (1)$$

Weight A is the weight to be applied to a loss value output by the first loss function and weight B is the weight of to be applied to a loss value output by the second loss function in the combined loss function. Weights A and B may be determined in any suitable manner (such as being defined by a programmer and based on previous simulations of training the ML model and their effects). To note, more complicated combinations of the loss functions may be used, and the example in equation (1) is but one example for explaining aspects of the present disclosure.

In training the ML model using the combined loss function, a historic dataset may be used. For example, the last two years of daily data points of user spending in defined categories and other time series datasets may be used to train the ML model. During training, the ML model may generate regressors for previous days in the dataset, and the regressors may be compared to the actual values. The regressors and actual values may be input into the combined loss function in generating a loss value. The ML model may also generate classifications associated with the regressors. In some implementations, whether a regressor is valid is based on a difference between the regressor and its associated actual data point. If the difference is greater than a tolerance, the regressor may be labeled as not valid. In addition, an actual data point of zero (such as no spending on that day) may be associated with the regressor being labeled as not valid. If the difference is less than the tolerance, the regressor may be labeled as valid. A generated classification may be compared to a predetermined threshold to identify as either valid or not valid, and the determination may be compared to the label of valid or not valid. Alternatively, the generated classification may be compared to the label to determine a difference used in the combined loss function. For example, if a predicted data point is identified as being valid (with the predicted data point being within a tolerance of the actual data point), the generated classification (in a range from 0 to 1) and the actual classification of 1 may be input into the combined loss function.

Single loss values generated by the combined loss function (such as A times a first loss value plus B times a second loss value) may be noisy. As such, a specific single loss value from the loss function (as compared to some other loss values) may indicate that the ML model is inaccurate in general (which it may not be) or vice versa. A large noise in a single loss function may cause a large adjustment to the ML model that may be undesired. In some implementations, such noise is to be compensated when training the ML model. For example, the loss value generated by the combined loss function may be based on a plurality of previously generated loss functions. In a specific example, the last ten (or another suitable number) of loss values generated may be averaged together to generate the current loss value. The current loss value (which is a combination of loss values) is then used in training the ML model. In this manner, the noise associated with a single loss value is reduced to prevent undesired adjustments to the ML model during training.

The ML model may continue to be trained using the historic time series data until suitably trained. In some implementations, training of the ML model may be completed based on the Adam optimization algorithm. However, optimization may be completed in any suitable manner. Training of the ML model may also occur periodically. For example, a user may indicate that the ML model is to be retrained based on newer time series datasets. In another example, the ML model may be retrained every six months or another suitable time interval. Retraining may be performed as described above with reference to a combined loss function using updated time series datasets.

As described above, a system is configured to determine which regressors are valid through the generation of classifications, which is based on sparsity of data in the time series datasets. In particular, an ML model may include a separate regressor layer and classification layer, with the regressor layer generating regressors and the classification layer generating classifications indicating which regressors are valid based on the sparsity of data input into an RNN of the ML model. In this manner, a user or other device may be prevented from receiving or may be alerted to any regressors/predictions determined with low confidence by the ML model as a result of sparse data. As such, the regressors provided by the ML model are of higher quality and reliability, thus improving any processes relying on such regressors. For example, for the Intuit Mint application, a user may be notified of reliable predictions in user spending but may not be notified through the application or other communications (such as email or push notifications) of spending predictions that are identified as being unreliable. In this manner, a user's financial decision making (such as spending and budgeting) is not influenced by such unreliable predictions. As such, the ML model is trained to handle sparse data to prevent providing unreliable regressors to the user.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for generating regressors, comprising:
    obtaining a plurality of time series datasets for a period of time;
    providing the plurality of time series datasets to a recurrent neural network (RNN) of a machine learning (ML) model;
    generating, by the RNN, one or more outputs associated with one or more time series datasets of the plurality of time series datasets;
    providing a first portion of the one or more outputs to a regressor layer of the ML model;
    providing a second portion of the one or more outputs to a classification layer of the ML model;
    generating, by the regressor layer, one or more regressors for the one or more time series datasets;
    generating, by the classification layer, one or more classifications associated with the one or more regressors, wherein each of the one or more classifications indicates whether an associated regressor is a valid regressor;
    for each of the one or more regressors, identifying whether the regressor is valid based on the associated classification; and
    outputting the one or more regressors, wherein outputting the one or more regressors includes preventing any regressor identified as not valid from being output.

2. The method of claim 1, wherein each classification provided by the classification layer is based on a sparsity of data in the associated time series dataset.

3. The method of claim 1, wherein:
    the regressor layer is associated with a first loss function;
    the classification layer is associated with a second loss function; and
    training the regressor layer and the classification layer is based on a combined loss function including the first loss function and the second loss function.

4. The method of claim 3, wherein the combined loss function generates a loss value based on a plurality of previously generated loss values.

5. The method of claim 1, wherein identifying whether a regressor is valid based on an associated classification includes:
    comparing the classification to a predetermined threshold;
    identifying the regressor as valid if the classification is greater than the predetermined threshold; and
    identifying the regressor as not valid if the classification is less than the predetermined threshold.

6. The method of claim 5, wherein the predetermined threshold is 0.5 and the classification is in a range from 0 to 1.

7. The method of claim 5, wherein preventing a regressor identified as not valid from being output includes replacing the regressor with 0 based on a classification associated with the regressor being less than the predetermined threshold.

8. The method of claim 1, wherein the RNN includes a plurality of long-short term memory (LSTM) units.

9. The method of claim 8, wherein:
    the RNN includes two layers; and
    each layer includes 528 LSTM units.

10. The method of claim 1, wherein:
    a regressor includes a prediction of future user spending in a category; and
    the plurality of time series datasets includes a history of user spending in a plurality of categories.

11. A system for generating regressors, comprising:
    one or more processors; and
    a memory storing instructions that, when executed by the one or more processors, causes the system to perform operations comprising:

obtaining a plurality of time series datasets for a period of time;
providing the plurality of time series datasets to a recurrent neural network (RNN) of a machine learning (ML) model;
generating, by the RNN, one or more outputs associated with one or more time series datasets of the plurality of time series datasets;
providing a first portion of the one or more outputs to a regressor layer of the ML model;
providing a second portion of the one or more outputs to a classification layer of the ML model;
generating, by the regressor layer, one or more regressors for the one or more time series datasets;
generating, by the classification layer, one or more classifications associated with the one or more regressors, wherein each of the one or more classifications indicates whether an associated regressor is a valid regressor;
for each of the one or more regressors, identifying whether the regressor is valid based on the associated classification; and
outputting the one or more regressors, wherein outputting the one or more regressors includes preventing any regressor identified as not valid from being output.

12. The system of claim 11, wherein each classification provided by the classification layer is based on a sparsity of data in the associated time series dataset.

13. The system of claim 11, wherein:
the regressor layer is associated with a first loss function;
the classification layer is associated with a second loss function; and
training the regressor layer and the classification layer is based on a combined loss function including the first loss function and the second loss function.

14. The system of claim 13, wherein the combined loss function generates a loss value based on a plurality of previously generated loss values.

15. The system of claim 11, wherein identifying whether a regressor is valid based on an associated classification includes:
comparing the classification to a predetermined threshold;
identifying the regressor as valid if the classification is greater than the predetermined threshold; and
identifying the regressor as not valid if the classification is less than the predetermined threshold.

16. The system of claim 15, wherein the predetermined threshold is 0.5 and the classification is in a range from 0 to 1.

17. The system of claim 15, wherein preventing a regressor identified as not valid from being output includes replacing the regressor with 0 based on a classification associated with the regressor being less than the predetermined threshold.

18. The system of claim 11, wherein the RNN includes a plurality of long-short term memory (LSTM) units.

19. The system of claim 18, wherein:
the RNN includes two layers; and
each layer includes 528 LSTM units.

20. The system of claim 11, wherein:
a regressor includes a prediction of future user spending in a category; and
the plurality of time series datasets includes a history of user spending in a plurality of categories.

* * * * *